United States Patent

[11] 3,544,700

| | | | |
|---|---|---|---|
| [72] | Inventor | Paolo Gazzana Priaroggia, Milan, Italy | |
| [21] | Appl. No. | 693,347 | |
| [22] | Filed | Dec. 26, 1967 | |
| [45] | Patented | Dec. 1, 1970 | |
| [73] | Assignee | Pirelli S.p.A. Milan, Italy a corporation of Italy | |
| [32] | Priority | Dec. 30, 1966 | |
| [33] | | Italy | |
| [31] | | No. 31,733/66 | |

[54] ELECTRICAL CABLE JOINTS
10 Claims, 2 Drawing Figs.

[52] U.S. Cl. .................................................. 174/15, 174/21

[51] Int. Cl. ............................................. H01b 7/34; H02g 15/24

[50] Field of Search ........................................... 174/15, 19—20, 22, 23, 25, 73—75, 84, 85, 89, 94

[56] References Cited
UNITED STATES PATENTS

| 1,680,231 | 8/1928 | Simons ........................ | 174/21X |
| 2,392,748 | 1/1946 | Lee .............................. | 174/22 |
| 2,967,901 | 1/1961 | Priaroggia .................... | 174/22X |
| 3,051,770 | 8/1962 | Palmieri ....................... | 174/22 |
| 3,363,049 | 1/1968 | Gosling et al. ................ | 174/22X |

*Primary Examiner*—Laramie E. Askin
*Assistant Examiner*—A. T. Grimley
*Attorney*—Ward, McElhannon, Brooks & Fitzpatrick ABSTRACT: Joining devices for electrical power cables comprising an electrical connecter an insulator surrounding the connecter an outer metal casing and a thermally and electrically insulative flange at each end of the joint which interconnects the metal casing and the outer sheath of the cables being joined.

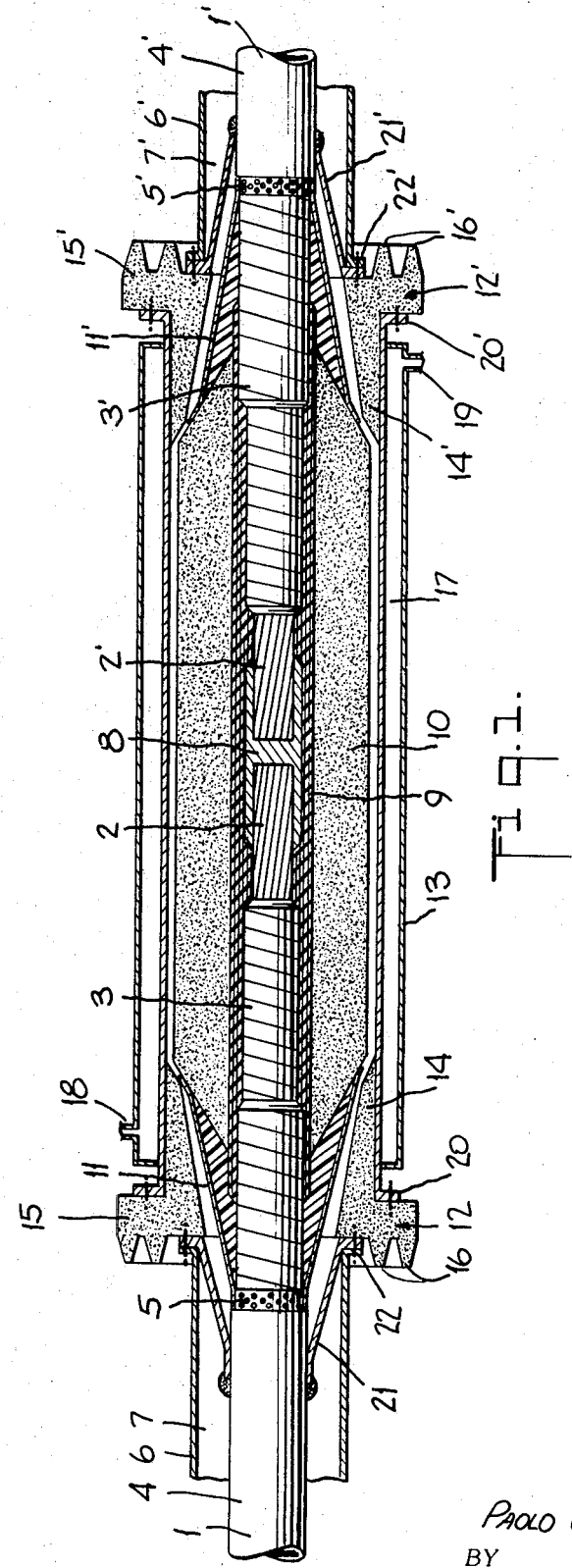

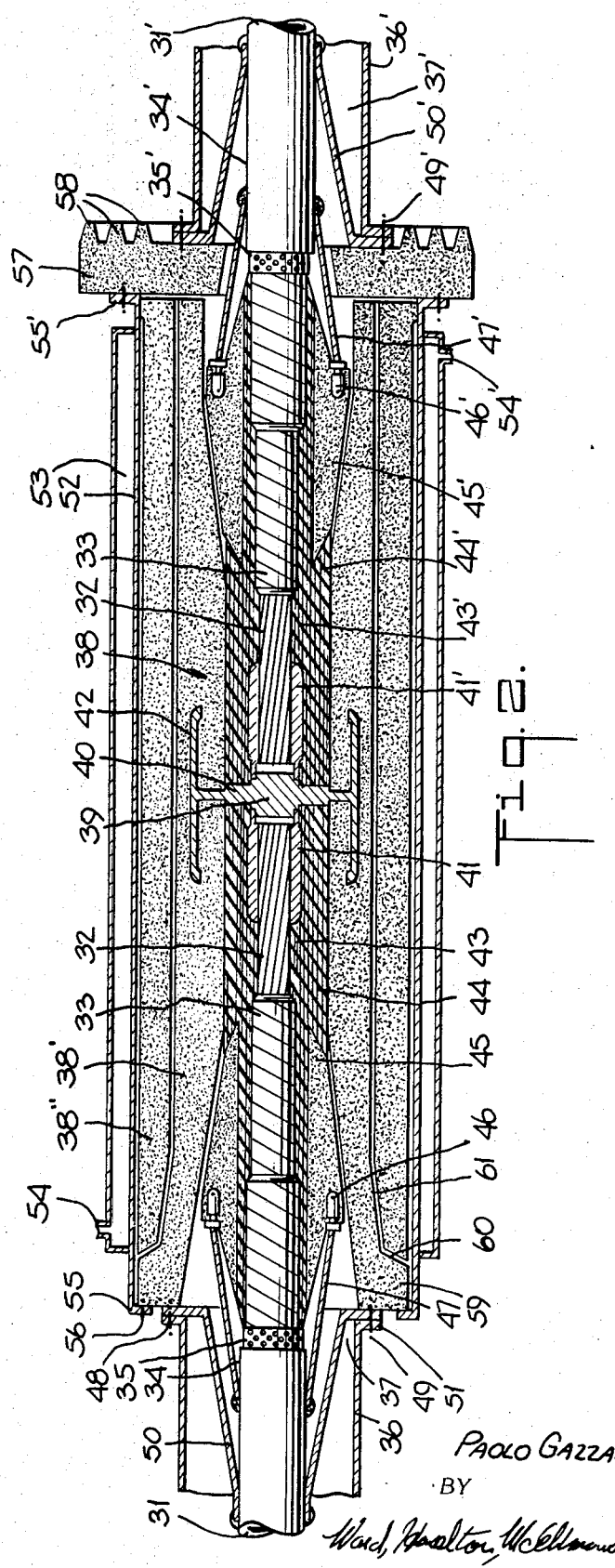

ELECTRICAL CABLE JOINTS

This invention relates to joints or connecters for electrical power cables and more particularly it concerns joints which enable electric cables to carry high intensity currents.

As is known, an electrical power cable comprises an elongated central conductor which is surrounded by an insulative covering.

The conductor is subjected to a voltage; and this in turn causes an electric current to pass through the conductor. The current, in passing through the conductor, dissipates energy due to the so-called "Joule effect". This Joule effect energy is dissipated in the form of heat.

The current carrying capacity of an electric cable is generally related to the highest temperature which its insulation can withstand without being damaged. Actually, the current carrying capacity of the cable determines the amount of power dissipated in consequence of the Joule effect. The value of this dissipated power, multiplied by the thermal resistance of the insulation, establishes a given temperature differential between the conductor and the surrounding ambient. As the temperature of the insulation is correlated with that of the conductor, it is easily understood that it is impossible to exceed the current carrying capacity which requires, for eliminating the losses due to the Joule effect, a temperature rise between the conductor and the surrounding ambient which would exceed the highest permissible temperature for the insulation.

As is known, the thermal resistance of the insulation depends on the thermal resistivity of the insulative material and upon its thickness. By increasing the latter, the resistivity is increased.

Now, by increasing the thickness of the insulation and by maintaining a given current (i.e. a constant amount of dissipated power) the temperature rise of the conductor is increased; and if the temperature was previously at the highest permissible value, the increase in insulation thickness will cause the insulation temperature to exceed the maximum admissible value. In such case insulation becomes damaged.

In practice, when a cable is laid underground, its insulation has a thermal resistivity ranging from 500° to 700° C. cm/W, while the surrounding earth has a thermal resistivity normally ranging between 50° and 150° C. cm./W. These features make it possible to determine, on the basis of the permissible temperature rise and on the geometrical dimensions of the cable, the corresponding value of the highest current which can be withstood by the conductor. In this manner the maximum current carrying capacity of the cable can be evaluated.

For certain well known reasons due to voltage resistance, the geometrical configuration of an electrical cable is modified at the connections or joining points between its various lengths. Because of these reasons the joints have a diameter greater than that of the cable itself. Accordingly, the dielectric material contained in the joints occupies a greater volume around the conductor, and its already high thermal resistance is even further increased.

Therefore, if the temperature rise used for calculating the current carrying capacity of the joint were the same as that which is permissible for the cable itself, the calculated current would produce an overheating of the joint; and its insulation would become damaged thereby. Consequently, in calculating the current carrying capacity of a cable, it is necessary to use as the admissible temperature rise, that which is admissible for the joints. Since this temperature rise is smaller than that for the cable itself, there results a limitation in the admissible current carrying capacity of the line constituted by the cable and the joint. Thus the power transmission capacity of the cable is not completely exploited. The joint acts, in fact, as a restriction point for the passage of current in the line.

Moreover, in order to build up lengths of electric cables able to transmit high intensity currents without exceeding the temperature limits imposed by the cable insulation, it is sometimes necessary to adopt means capable of absorbing the amount of heat generated in consequence of the Joule effect. For this purpose the cables are laid, for example inside of pipes, and a suitable cooling liquid, generally water, is circulated in the hollow space between the pipe and the outer sheath of the cable.

In installations of this type, it becomes important to face the problem of avoiding the above-discussed disadvantages originated by greater thermal insulation at the cable joints. Therefore a separate cooling operation is generally carried out in the region of the joints; and this separate cooling operation is obtained at a temperature much lower than that of the remainder of the cable, so as to balance the possible greater losses occurring at the joints in consequence of the Joule effect. This cooling is generally carried out in a separate cooling circuit, by the recirculation of brine at a temperature below 0° C. This type of cooling has the drawback that in the cable points nearest to the joint, the cable cooling water may freeze, thus causing the rupture of the outer pipe of the cooling circuit.

The present invention aims at providing improved joints which permit the elimination of the above indicated disadvantages, and which allow a fuller utilization of the line constituted by the cable and the joint. Further, the present invention aims at the elimination of all possible singular points to the effect of heat transmission to the outside.

The present invention involves an improved joint for oil-filled power cables of the type which transmit high intensity electrical current and which are laid into pipes cooled by fluid circulation. The present invention is characterized in that it includes a prefabricated insulating sleeve disposed around the joining zone. A metallic casing tightly encloses the sleeve. The casing is provided with a double wall which creates a hollow space for the circulation of the cooling fluid. Inlet and outlet holes are provided for this fluid. Sealing means are disposed at each end of the joint between the oil ambient inside the joint and the ambient of cooling fluid inside the metallic pipe. A prefabricated annular flange is mechanically connected to the metal casing to provide a thermal interruption between the cooling circuit of the cable and of the joint; and at the same time to provide an electrical interruption between the cable sheath (and in some cases, the metallic pipe surrounding it) and the joint casing.

The insulating sleeve and the flange are preferably made of a material having a thermal resistivity of the order of that of the surrounding earth. This material should also possess dielectric characteristics at least equal to those of the cable insulation.

Materials complying with these requirements and which can be used in this connection include epoxy resins charged with quartz or alumina, moulding epoxy resins charged with mineral fillers, and moulding polyesters charged with glass fibers.

The thermal and electric characteristics of these materials are set forth in TABLE I below; and these properties have been deduced from information given in the publication "Modern Plastics Encyclopedia", 1965, published by Breskin Publications Inc., New York.

TABLE I

| Resin | Thermal resistivity, ° C.Xcm./watt | Losses, Cot $\phi$* at 60 Hz. | Dielectric strength, kv./mm. |
| --- | --- | --- | --- |
| Pouring resin charged with quartz | 120–240 | 0.008–0.03 | 16–22 |
| Moulding epoxy resin charged with mineral fillers | 130–340 | 0.06–0.08 | 12–14 |
| Moulding polyester charged with glass fibers | 150–240 | 0.01–0.04 | 15–17 |

*$\phi$=Dielectric power factor.

The sealing means disposed at the ends of the joint are advantageously in the shape of conical connections. These are made of metallic material; and they are sealed at their narrow end to the cable sheath. They are provided at their other end with an end ring tightly connected about the openings of the flange or sleeve and to a corresponding end ring, of equal diameter, of the metallic pipe.

At least one of the flanges is advantageously provided with circular concentric fins which face out from the ends of the joint. These fins serve to increase the air gap between the various metallic parts which are subjected to high voltage.

A straight-through joint for pipe cables as that described above, in a preferred embodiment, is provided at each end with an annular flange. The flange is provided with a hollow longitudinal extension which may be either directly sealed to or separated from the flange. The longitudinal extension, which protrudes inside the joint, has an outer surface which is cylindrical and an inner surface which is frustoconical in configuration, with a double inclination.

The casing has an inner diameter equal to the outer diameter of the longitudinal extension, and surrounds it, being tightly connected to the inner surface of the flanges.

The insulating sleeve has a cylindrical shape in the center thereof. It is tapered, however, at its ends, which are in the shape of conical frustums. The outer diameter of the insulating sleeve is less than the inner diameter of the casing; and it is held enclosed in the unit constituted by the casing and the two flanges.

In a preferred embodiment there is provided a stop joint, which comprises a cylindrical sleeve having an outer diameter equal to the inner diameter of the casing, and an inner cylindrical surface with outwardly flared ends. The sleeve is equal in length to the casing. An annular flange is provided at one end and is tightly connected to the casing. The casing is provided, at the end opposite the flange, with a ring which extends towards the axis of the joint. This ring is tightly connected to the sleeve. Its inner diameter is greater than the outer diameter of the end ring of the conical connection.

According to one form of the invention, the ends of the joint are each provided with a flange and are built up as described above in respect of the embodiment comprising the flanged end.

A further modification consists in making the sleeve of two elements which can be assembled one on the other to form a single unit. One of these elements, called "base element" is provided at its outside with a termination shaped as a flange, the outer diameter of which is equal to that of the sleeve. The base element is also provided with a cylindrical portion of smaller diameter flared out to the flange along a frustoconical surface with double inclination. The second element, which can be inserted on the base element, has at its outside a cylindrical surface, whose outer diameter is equal to that of the flange, and at its inside, a surface conjugate to the outer surface of the base element.

Various further and more specific objects, features and advantages of the invention will appear from the description given below, taken in connection with the accompanying drawings, illustrating by way of example preferred forms of the invention.

In the drawings:

FIG. 1 is a longitudinal section view illustrating a straight-through joint for oil-filled cables laid inside pipes where cooling fluid is circulated; and FIG. 2 is a view similar to FIG. 1 illustrating a stop joint for oil-filled cables laid into pipes where cooling fluid is circulated.

In the arrangement of FIG. 1 two lengths 1 and 1' of electrical cable are joined together. These cable lengths are made up of elongated electrical conductors 2 and 2', surrounded by electrical insulations 3 and 3', which in turn are enclosed in outer sheaths 4 and 4'. Electrically conductive screens 5 and 5' are disposed about the insulations 3 and 3'. These screens may, for example, comprise thin pierced metallic tapes helically wound on the insulations 3 and 3'.

The cable lengths 1 and 1' are surrounded by pipes 6 and 6' which define hollow annular spaces 7 and 7' within which cooling fluid may be circulated. For this purpose, each pipe may be provided with one or several inlet and outlet openings (not shown) through which the cooling fluid may be pumped. The heated liquid which flows out from the pipes 6 and 6' may simply be disposed of when an open cycle is used and an inexhaustible source of cold water is available. Alternatively a closed cycle may be employed and the heated water may be cooled for reuse by means of coolers or refrigerators.

The ends of the conductors 2 and 2' are stripped as shown in FIG. 1; and they are connected by means of a metallic clamp 8 to which they are secured by known means, for instance by soldering or crimping.

The joining zone is covered with a rebuilt paper insulation 9, which has a diameter greater than that of the original cable insulations 3 and 3', and which extends axially beyond the joining zone. Since, as mentioned above, paper has a considerable thermal resistance, the thickness of the rebuilt paper insulation 9 should be as small as possible.

The joint insulation is constituted by a prefabricated sleeve 10, made of epoxy resin charged with quartz powder. The sleeve 10 terminates at both ends with tapered portions each bearing a stress cone 11 and 11' of a known type. The stress cones are connected to the screens 5 and 5'.

The two ends of the joint are provided with flanges 12 and 12' which are also prefabricated, and which are made of suitably charged epoxy resin. The flanges 12 and 12' serve to provide an interconnection between a metallic casing 13 and the pipes 6 and 6'. They also serve for other purposes as will be described more fully herebelow.

The flanges 12 and 12' are each directed towards the center of the joint. As shown, they are each provided with a longitudinal extension 14 and 14'. The external surface of each extension is cylindrical and its diameter is slightly greater than that of the sleeve 10. The internal configuration of each extension is frustoconical; and the smaller diameter thereof extends outwardly with respect to the joint. Rings 15 and 15', having diameters greater than that of the longitudinal extensions 14 and 14' are secured to the longitudinal extensions and serve to complete the flanges. The longitudinal extensions 14 and 14' may be connected to the rings 15 and 15' by means of bolts. On the other hand, they may constitute, together with the extensions, a single prefabricated sleeve.

Fins 16 and 16' may be formed on the external surfaces of the flanges 12 and 12'. These fins serve to prolong the free passage in air (i.e. the air gap) between the metallic parts under voltage. This is particularly useful to prevent sparkover on the flange surface in case of occasional switching surges.

The outer protection of the joint is insured by the metallic casing 13. This casing is provided with a double wall to create a hollow annular space 17 for the circulation of cooling fluid; and it is provided with openings 18 and 19 for the admission and the discharge of such fluid.

The ends of the casing 13 are tightly connected to the flanges 12 and 12', as by means of bolts (indicated schematically in FIG. 1 by center lines only).

In the portions of the flanges 12 and 12' which are external to the joint, they are tightly connected to the pipes 6 and 6' and to connections 21 and 21'. Again, conventional bolts (indicated only be means of center lines) may be provided for this purpose.

Each of the connections 21 and 21' is soldered at its other end to one of the metallic sheaths 4 and 4'. The purpose of these connections is to separate the oil ambient inside the joint from the cooling liquid inside the pipes 6 and 6'.

As will be noted, the joint casing 13 and the pipes 6 and 6' are separated from each other by means of the flanges 12 and 12'. These serve to provide a thermal insulation barrier sufficient to prevent the freezing of water in the pipes 6 and 6' when brine is used to cool the casing 13. In addition the flanges 12 and 12' also serve to provide electrical isolation of the circuit constituted by the cable sheaths 4 and 4'. This is obtained by virtue of the good insulating properties of the material of which the flanges are made. They also serve to prevent the occurrence of eddy currents. All of the hollow spaces inside the joint casing 13 are filled with cable insulating oil.

FIG. 2 illustrates a stop joint for oil-filled cables laid in pipes through which cooling fluid is circulated. Two cable lengths 31 and 31' to be joined are each constituted by elongated electrical conductors 32 and 32', surrounded by insulations 33 and 33'. These in turn are enclosed within metallic sheaths 34 and 34'.

Electrically conductive screens 35 and 35', each constituted, for example, by a thin pierced helically wound metal tape, are disposed on each of the insulations 33 and 33'.

The cable lengths 31 and 31' are each surrounded by a metallic pipe 36 and 36', which forms around the cables hollow annular spaces 37 and 37'. Within these spaces a cooling liquid is circulated; and for this purpose the pipes are provided with one or more openings (not shown) for the admission and the discharge of the cooling fluid which may be circulated. for example, by means of a pump (also not shown).

As indicated above, th joint illustrated in FIG. 2 is a stop joint for oil-filled cables; that is, it is capable of separating the oil ambient of the two joined cable lengths.

For this purpose the joint of FIG. 2 is provided with a prefabricated sleeve 38 of epoxy resin charged with quartz powder. The inner cylindrical opening of the sleeve 38 is tightly divided into two parts by means of a metallic element 39. This element comprises a central flange 40 which serves as a barrier against oil flow, and two clamps 41 and 41' disposed in axial alinement on both sides of the flange. The axes of the clamps 41 and 41' are coincident with the central axis of the sleeve 38. There is also provided an electrode 42, completely embedded in the sleeve 38. This electrode, in the present embodiment, is completely connected with the flange 40.

The two clamps 41 and 41' secure the two conductors 32 and 32' together. These conductors are prepared for clamping by taking the ends of the cable lengths 31 and 31' and removing for a certain length, the sheaths 34 and 34'; and, in decreasing lengths, the screens 35 and 35', and the insulations 33 and 33', thereby baring the conductors 32 and 32'.

Rebuilt insulations 43 and 43' are provided about the exposed cable ends; and these may be obtained by manually winding tapes of insulating paper about the sealing ends of the cable. The insulations are shaped in such a way as to contain the clamps 41 and 41'.

Tubes 44 and 44' of insulating paper are provided about the rebuilt insulations 43 and 43'. These tubes extend axially over only that portion of the insulations which is nearest to the metallic element 39.

The outermost portions of the rebuilt insulations 43 and 43' carry rings 45 and 45' of suitably charged epoxy resin. These rings incorporate electrodes 46 and 46' which are connected to the metallic sheaths 34 and 34' of the cable by means of the metallic connections 47, 47'. These latter are constituted, for example, by a pierced metallic sheet.

Referring now to the left end of the joint illustrated in FIG 2, the sleeve 38 is seen to be tightly connected, as by an end ring 48 and bolts 49 (shown schematically by center lines only) to a conical connecter 50. This in turn is tightly connected at its narrow end to the cable sheath 34, for example by soldering. The conical connecter 50 serves to separate the cooled ambient inside the pipe 36 from the ambient of insulating oil inside the cable and the corresponding part of the joint. The pipe 36 in turn, is tightly fastened by means of a further end ring 51, to the end ring 48 having the same diameter and making part of the conical connecter 50.

The sleeve 38 of epoxy resin may be made in a single piece, and in such case it will have an outer cylindrical surface which extends in such configuration for its entire length. A metallic casing 52 is disposed about the sleeve 38.

The casing 52 is provided with a double wall in order to create a hollow space 53 within which cooling fluid may be circulated. For this purpose the hollow space 53 is provided with coolant fluid inlet and outlet openings 54 and 54'.

The joint casing 52 is also provided with a joint casing end ring 55 by means of which it is connected to the insulating sleeve 38, for example by bolts 56 (shown schematically be center lines only).

The internal diameter of the joint casing end ring 55 is greater than the outer diameter of the end ring 48. Accordingly, there exists an exposed portion of the surface of the insulating sleeve 38 between the metallic terminations of the connecter 50 with the cable pipe 36 and the termination formed by the joint casing end ring 55. This exposed portion of the sleeve 38 serves to interrupt both the thermal and the electrical continuity between the joint casing and the cable pipe.

The insulating sleeve 38 may also be constituted, as shown in FIG. 2, by two separate elements 38' and 38''. This, besides affording the advantage of an easier handling, makes it possible to standardize the parts constituting the joint. This is because with the same internal element 38', and by varying only the external elements 38'', it is possible to obtain joints of different diameter in accordance with the various service requirements.

In the embodiment shown in FIG. 2, the insulating sleeve of suitably charged epoxy resin, constituting the internal element 38' and incorporating the electrode 42 (which is secured to the flange 40, the metallic element 39 and the clamps 41 and 41'), has a cylindrical portion whose diameter is considerably smaller than that of the metallic casing 52. Accordingly, a space is left for receiving the external element 38''. This also is constituted by a hollow cylindrical prefabricated sleeve of charged epoxy resin. The inner diameter of this sleeve corresponds to the outer diameter of the element 38'; while the outer diameter of the element 38'' corresponds to the inner diameter of the metallic casing 52.

When the insulating sleeve 38 is constituted by two elements, the inner element must be allowed to be inserted inside the outer element. This may be obtained by terminating the joint at at least one end as represented at the right end of the joint in FIG. 2. In this case a ring shaped flange 57 is used, to which the metallic casing 52 is tightly connected by means of a further joint casing end ring 55' and bolts 56. The conical connecter 50' and the pipe 36' are also tightly connected, by means of the bolts 49 in a manner similar to that described for the corresponding elements in the preceding embodiment. Also in this case the flange 57 may be provided in its outer face with fins 58 analogous to the fins 16 of the embodiment of FIG. 1, and serving the same purpose.

The left end of the joint may be built up, as regards its remaining parts, as described above in connection with the right end. However, it can also be made as illustrated in FIG. 2. In this case the internal element 38' is formed at its left end with an annular flange 59, the outer diameter of which is equal to the diameter established for the insulating sleeve 38.

The flange 59 in such case is tapered to conform to the central cylindrical portion by means of two frustoconical surfaces 60, 61, having nearly complementary inclinations. That is, they form a straight angle when added together. The surface of the more minor inclination is positioned adjacent to the flange 59.

The element 38'' has an outer cylindrical surface whose diameter is equal to the outer diameter of the flange 59; and an inner surface which closely conforms to the outer surface of the element 38'. That is, the inner surface of the element 38'' is constituted by a cylindrical part terminating at one end with two frustoconical surfaces corresponding to the surfaces 60, 61. In this way it is possible to insert the element 38' inside the element 38'' so that the frustoconical surfaces 60, 61 act as a stop to prevent any further longitudinal movement.

The joints in accordance with the invention permit to carry out the cooling with a liquid having a temperature as low as desired. Moreover, they may advantageously operate, by means of the end flanges, to provide electrical isolation of the cable sheath and of the cooling pipe, thereby preventing the circulation therein of eddy currents.

A further advantage of these joints is that they provide very good electrical insulation, without involving any drawback as regards heat transmission, because the sleeve which occupies the entire inner part of the joint has a thermal resistivity of the order of that of the surrounding earth.

Although certain specific embodiments of the invention are herein disclosed for purposes of explanation, further modifications thereof, after study of this specification, will be apparent to those skilled in the art to which the invention pertains. Reference should accordingly be had to the appended claims in determining the scope of the invention.

I claim:

1. An improved joint for oil-filled electrical power cables carrying high intensity currents and laid into pipes cooled by fluid circulation, said joint comprising: a connecter for joining the conductors of said cables, a prefabricated insulating sleeve disposed around the zone of said connecter a double walled metallic casing tightly enclosing the sleeve and having spaced inner and outer walls defining a hollow annular space for the circulation of a cooling fluid, sealing means disposed at each end of the joint and positioned to separate the oil ambient inside the joint and the cooling fluid ambient inside the cable pipes, a prefabricated annular flange mechanically connected to the metallic casing and providing a thermal insulative barrier between the cable coolant regions and the joint coolant regions, and an electrical insulative barrier between the cable sheath and the metallic casing.

2. An improved joint as in claim 1 wherein at least one of said cables is laid in an electrically conductive pipe and said electrical insulative barrier extends also between the metallic casing and said pipe.

3. An improved joint as in claim 1, wherein said sleeve and said flange are made of a material having a thermal resistivity of the order of that of the earth and further having dielectric characteristics at least equal to those of the cable insulation.

4. An improved joint as in claim 1 wherein the material constituting the sleeve is selected from the class consisting of pourable epoxy resin charged with quartz powder, pourable epoxy resin charged with alumina, moldable epoxy resin charged with mineral fillers, and moldable polyester charged with glass fibers.

5. An improved joint as in claim 2 wherein said sealing means are metallic conical connecters sealed at their smaller ends to the cable sheath and provided at their other ends with a connecter closing ring tightly connected around the openings of the flange and to a corresponding end ring, having the same diameter, of said pipe.

6. An improved joint as in claim 1 wherein the surface of the flange directed towards the outside of the joint is provided with a plurality of circular concentric fins.

7. An improved joint as in claim 1 and serving as a straight-through joint, wherein similar annular flanges are disposed at both ends of the joint and are each provided with a hollow longitudinal extension whose outer surface is cylindrical and has a diameter smaller than that of the flange and whose inner surface is frustoconical and has a double inclination with the smaller diameter end facing the outer end of the joint, wherein said casing is cylindrical and has an inner diameter equal to the outer diameter of said longitudinal extension and is tightly connected thereby to each flange, thus to surround the cylindrical surface of each longitudinal extension, and wherein said sleeve is also cylindrical, and has ends tapered in frustoconical shape with the outer diameter being smaller than the inner diameter of said casing, said sleeve being enclosed within the unit constituted by said casing and said flanges.

8. An improved joint as in claim 5 and serving as a stop joint, wherein said sleeve has provided therein a metallic element which serves as a barrier against oil passage and which further serves as an electric connection for the cable lengths to be joined, said sleeve having an outer diameter equal to the inner diameter of said casing, said sleeve further having an internal cylindrical surface with flared ends and a length equal to that of the casing, said casing in turn being at one end connected to said annular flange, and being provided at the other end with a casing closing ring which extends towards the joint axis and which is tightly connected with the corresponding end of said sleeve, the inner diameter of said casing closing ring being greater than the outer diameter of the corresponding connecter closing ring.

9. An improved joint as in claim 8 wherein said joint is provided at both ends with said annular flanges, said flanges being tightly connected with said casing and being tightly connected at their surface towards the joint outside with said conical connecters.

10. An improved joint as in claim 1 wherein said sleeve is constituted by two elements, the first being an internal element and having a terminal part thereof shaped as a flange which has an outer diameter equal to that of the sleeve, said internal element having an internal cylindrical portion of smaller diameter flared out to the flange according to a double-inclined surface whose greater inclination is closer to the flange, the other element of said sleeve being an external element fitted over said internal element said external element having a cylindrical outer surface, whose diameter is equal to that of said flange, said external element further having an inner surface which closely conforms to the outer surface of said internal element.